United States Patent
Nalliah et al.

(10) Patent No.: US 10,664,482 B2
(45) Date of Patent: May 26, 2020

(54) PROVIDING RELEVANCE BASED DYNAMIC HASHTAG NAVIGATION

(71) Applicant: MICROSOFT TECHNOLOGY LICENSING, LLC, Redmond, WA (US)

(72) Inventors: Selva Nalliah, Redmond, WA (US); Scott Stiles, Redmond, WA (US); Tali Roth, Seattle, WA (US); Nithya Ramkumar, Redmond, WA (US); Bernt Ivar Olsen, Tromso (NO); Amund Kronen Johansen, Tromso (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 910 days.

(21) Appl. No.: 14/968,758

(22) Filed: Dec. 14, 2015

(65) Prior Publication Data

US 2017/0169026 A1    Jun. 15, 2017

(51) Int. Cl.
| | | |
|---|---|---|
| G06F 16/248 | (2019.01) | |
| G06F 16/2457 | (2019.01) | |
| G06Q 10/00 | (2012.01) | |
| G06Q 30/02 | (2012.01) | |
| H04L 12/58 | (2006.01) | |

(52) U.S. Cl.
CPC ...... *G06F 16/24578* (2019.01); *G06F 16/248* (2019.01); *G06Q 10/00* (2013.01); *G06Q 30/02* (2013.01); *H04L 51/046* (2013.01)

(58) Field of Classification Search
None
See application file for complete search history.

(56) References Cited

U.S. PATENT DOCUMENTS

| | | |
|---|---|---|
| 7,346,660 B2 | 3/2008 | Kulkarni |
| 7,647,309 B1 | 1/2010 | Bar |
| 7,953,736 B2 | 5/2011 | Rinearson et al. |
| 8,126,863 B2 | 2/2012 | Williams et al. |
| 8,392,516 B2 | 3/2013 | Deluca et al. |
| 8,516,058 B2 | 8/2013 | Stern et al. |
| 8,843,568 B2 | 9/2014 | Vitaldevara et al. |

(Continued)

FOREIGN PATENT DOCUMENTS

WO    2013113028 A1    8/2013

OTHER PUBLICATIONS

Kywe, Su Mon; Hoang, Tuan-Anh; Lim, Ee Peng; and Zhu, Feida. On recommending hashtags in Twitter networks. (2012). Social Informatics: 4th International Conference, SocInfo 2012, Lausanne, Switzerland, Dec. 5-7, 2012. Proceedings. 7710, 337-350. Research Collection School of Information Systems. (Year: 2012).*

(Continued)

*Primary Examiner* — Cheyne D Ly
(74) *Attorney, Agent, or Firm* — Michael Best & Friedrich LLP

(57) ABSTRACT

Relevance based dynamic navigation is provided. A communication application searches communications to identify hashtags associated with the communications. A relevance score is computed for each hashtag based on a relevance criteria associated with the hashtags. The hashtags are ranked based on the relevance score. Next, the ranked hashtags are presented in a navigation user interface.

16 Claims, 7 Drawing Sheets

(56) References Cited

U.S. PATENT DOCUMENTS

| | | |
|---|---|---|
| 9,071,560 B2 | 6/2015 | Portilla |
| 2003/0028603 A1 | 2/2003 | Aktas et al. |
| 2008/0091834 A1 | 4/2008 | Norton |
| 2009/0319456 A1 | 12/2009 | Consul et al. |
| 2014/0123075 A1 | 5/2014 | Champion et al. |
| 2014/0330821 A1 | 11/2014 | Tullis et al. |
| 2015/0058711 A1 | 2/2015 | Zeng et al. |
| 2015/0073895 A1 | 3/2015 | Kamin et al. |
| 2015/0081703 A1 | 3/2015 | Murphy-Chutorian et al. |
| 2015/0186366 A1 | 7/2015 | Yan et al. |
| 2016/0117063 A1* | 4/2016 | Fuller ............ G06F 3/04817 715/739 |
| 2016/0189040 A1* | 6/2016 | Vickrey ............ G06N 5/04 706/12 |
| 2016/0224686 A1* | 8/2016 | Ramanathan ........ G06F 16/951 |
| 2016/0253715 A1* | 9/2016 | Xie ............... G06Q 30/0251 705/14.72 |
| 2016/0328401 A1* | 11/2016 | Dhawan ........... G06F 17/30867 |

OTHER PUBLICATIONS

Zangerle, E., Gassier, W.: Recommending #-tags in twitter. In: Proceedings of the CEUR Workshop (2011), pp. 1-12. (Year: 2011).*

S. M. Kywe, T.-A. Hoang, E.-P. Lim, and F. Zhu, "On Recommending Hashtags in Twitter Networks," in the 4th Int. Conference on Social Informatics, 2012, pp. 1-14 (Year: 2012).*

Roth, Corey, "How to: Query SharePoint 2013 search for trending tags", Published on: Nov. 12, 2013 Available at: http://www.dotnetmafia.com/blogs/dotnettipoftheday/archive/2013/11/12/how-to-query-search-for-trending-tags.aspx.

"Tumblr Staff—New feature—Tag filtering", Published on: May 15, 2008 Available at: http://staff.tumblr.com/post/34933619/new-feature-tag-filtering.

"Tagging and Categorizing Outlook Email Message", Published on: Mar. 22, 2014 Available at: http://www.techhit.com/SimplyTag/help/tagging-and-categorizing-outlook-email-messages.html.

Mishra, et al., "Tag Relevance for Social Image Retrieval in Accordance with Neighbor Voting Algorithm", In International Journal of Computer Science and Network Security, vol. 14, No. 7, Jul. 2014, pp. 50-57.

Liu, et al., "Tag Ranking", In Proceedings of 18th International World Wide Web Conference, Apr. 20, 2009, pp. 351-360.

Vaughan, Pamela, "33 Examples of Dynamic Tags to Personalize Your Email Sends", Published on: Jun. 22, 2012 Available at: http://blog.hubspot.com/blog/tabid/6307/bid/33315/33-Examples-of-Dynamic-Tags-to-Personalize-Your-Email-Sends.aspx.

Cutrell, et al., "Fast, Flexible Filtering with Phlat—Personal Search and Organization Made Easy", In Proceedings of Human Factors in Computing Systems, Apr. 22, 2006, 10 pages.

"International Search Report and Written Opinion Issued in PCT Application No. PCT/US2016/063803", dated Feb. 15, 2017, 14 Pages.

* cited by examiner

FIG. 4

| Folders | Inbox | All | Work Project |
|---|---|---|---|
| Inbox  1 | | | From: Bob Jackson (Supervisor) |
| ... | Bob Jackson (Supervisor)  8:20PM | | To: John Doe |
| Relevant Tags  424 | Work project | | |
| #Strategy  2 | John, please write a doc... | | John please write a brief about the first amendment. |
| #Complete  17  422 | Jackson Jefferson (Co-worker)  6:26 PM | | Amendment I |
| | Another item | | |
| | Hi john, here is a resource... | | Congress shall make no law respecting an establishment of religion, or prohibiting the free exercise thereof; or abridging the freedom of speech, or of the press; or the right of the people peaceably to assemble, and to petition the government for a redress of grievances. |
| | | | 424 |
| | | | #Strategy  422 |
| | | | #Complete |

400

402

416

PROVIDING RELEVANCE BASED DYNAMIC HASHTAG NAVIGATION

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications facilitate communications.

One of the recent and increasingly popular developments in electronic communications (email, messaging, etc.) is the use of labels, tats, or hashtags to classify exchanged communications or portions of content therein. The popularity of hashtags, however, results in degradation of experience in their use due to high number of tags that can be used (practically, users may create any tag). Thus, requiring a user to actively manage their list of tags or having to rely on search may not provide an optimal user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to relevance based dynamic hashtag navigation. In some examples, a communication application may search communications to identify hashtags associated with the communications. A relevance score may be computed for each hashtag based on a relevance criteria associated with the hashtags. The hashtags may be ranked based on the relevance score. Next, the hashtags may be presented in a navigation user interface.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4 is a display diagram illustrating an example of presenting relevance based dynamic hashtag navigation, according to embodiments;

DETAILED DESCRIPTION

Figure 1:
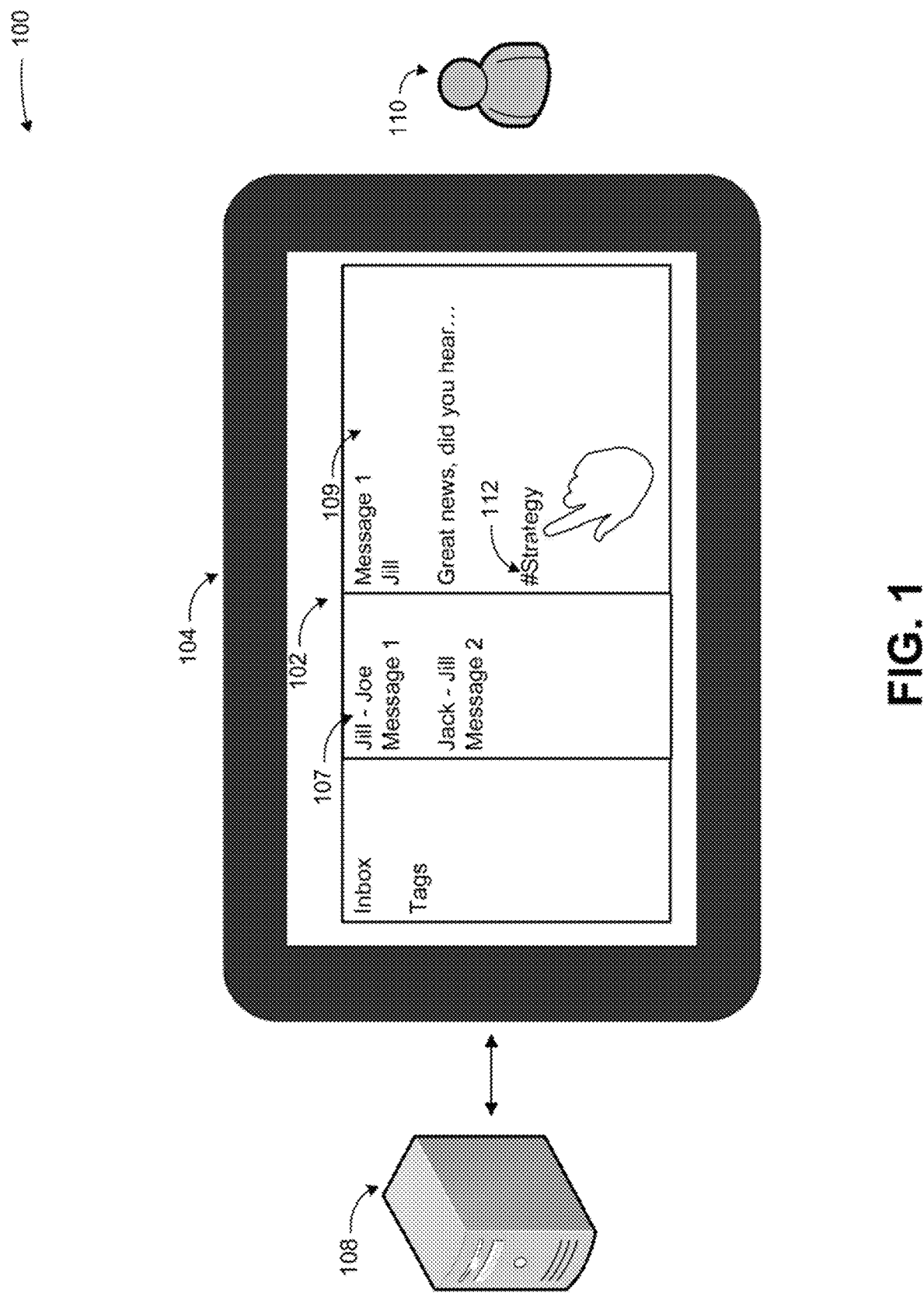
FIG. 1 is a conceptual diagram illustrating an example of providing relevance based dynamic hashtag navigation, according to embodiments.

As briefly described above, relevance based dynamic hashtag navigation may be provided by a communication application. The communication application may search communications to identify hashtags associated with the communications. A relevance score may be computed for each hashtag based on a relevance criteria associated with the hashtags. The relevance criteria may include a usage recentness, a usage frequency, a participant usage, and/or a group usage, among other criteria associated with hashtags. The hashtags may be ranked based on the relevance score. Next, the hashtags may be presented in a navigation user interface. A relevance score of the hashtags may be continually monitored and updated based on changes to the relevance criteria. A position of a hashtag may be moved up and down in the navigation user interlace based on an increase or decrease of the relevance score. A subset of the hashtags with a relevance score below an interest threshold may also be removed from the navigation user interface. Alternatively, the subset of the hashtags with a relevance score below the interest threshold may be moved to a secondary user interface.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing, environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a Volatile computer memory, a non-volatile memory, a hard drive, a flash drive, a floppy disk, or a compact disk, and comparable hardware media.

Throughout this specification, the term "platform" may be a combination of software and hardware components to provide relevance based dynamic hashtag navigation. Examples of platforms include, but are not limited to, a hosted service executed over a plurality of servers, an application executed on a single computing device, and comparable systems. The term "server" generally refers to, a computing device executing one or More software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component at computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience a visual display associated with an application or service through which a riser interacts with the application or service. A user action refers to an interaction between a user and a user experience of an application or a user experience provided by a service that includes one of touch input, gesture input, voice, command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing relevance based dynamic hashtag navigation, according to embodiments.

In a diagram 100, a computing device 104 may execute a communication application 102. Examples of the communication application 102 may include an email processing application, a messaging application, a document processing application, a spreadsheet processing application, a presentation application and/or a conferencing application, among others. The computing device 104 may include a tablet device, a laptop computer, a desktop computer, and a smart phone, among others. The computing device 104 may include a special purpose computing device configured to provide communications management through a display component configured to display communications, a communication component configured to transmit communications, and/or a storage component configured to store communications, among other components.

The computing device 104 may display the communication application 102 to a participant 110. The participant (such as a person) may receive and transmit a communication 109 (and other communications) to communicate with other participants. The participant 110 may be allowed to interact with the communication application 102 through an input device or touch enabled display component of the computing device 104. The computing device 104 may also include a display device such as the touch enabled display component, and a monitor, among others to provide the communication application 102 to the participant 110.

A rendering module of the communication application 102 may present communication summaries 107 of communications between the participant 110 and other participants. The rendering module may also display a communication 109 associated with one of the communication summaries. The communication 109 may include an email, a message, a video conference, and or an audio conference, among others.

A relevancy module of the communication application 102 may search communications to identify hashtags associated with the communications. A hashtag may include a label or a description used to categorize the communication. A relevance score may be computed for each hashtag based on a relevance criteria associated with the hashtags. The relevance criteria may include a usage frequency, a usage recentness, a participant usage, and/or a group usage, among other criteria. Next, the hashtags may be ranked based on, the relevance score. Furthermore, the rendering module of the communication application 102 may present the hashtags in a navigation user interface. The relevance score of the hashtags may be continually monitored and updated based on changes to the relevance criteria. A position of the hashtags may also be moved up or down in the navigation user interface based on changes to the relevance score.

The communication 109 may be stored and managed locally within the computing device 104. Alternatively, the communication 109 may be retrieved from a server 108 such as a content server, and/or a communication server, among others that manages communications. Another example of the server 108 may include an email server that provides communications to be presented by the communication application 102. Furthermore, the computing device 104 may communicate, with the server 108 through a network. The network may provide wired or wireless communications between nodes such, as the computing device 104, or the server 108, among others.

Alternatively, the server 108 may provide the communication application 102. The computing device 104 may present a user interface of the communication application 102. The server 108 may execute operations associated with relevance based dynamic hash tag navigation.

The participant 110 may interact with the communication application 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 104, the communication application 102, embodiments are not limited to these components or system configurations and can be implemented with other system configuration employing fewer or additional components.

Figure 2:
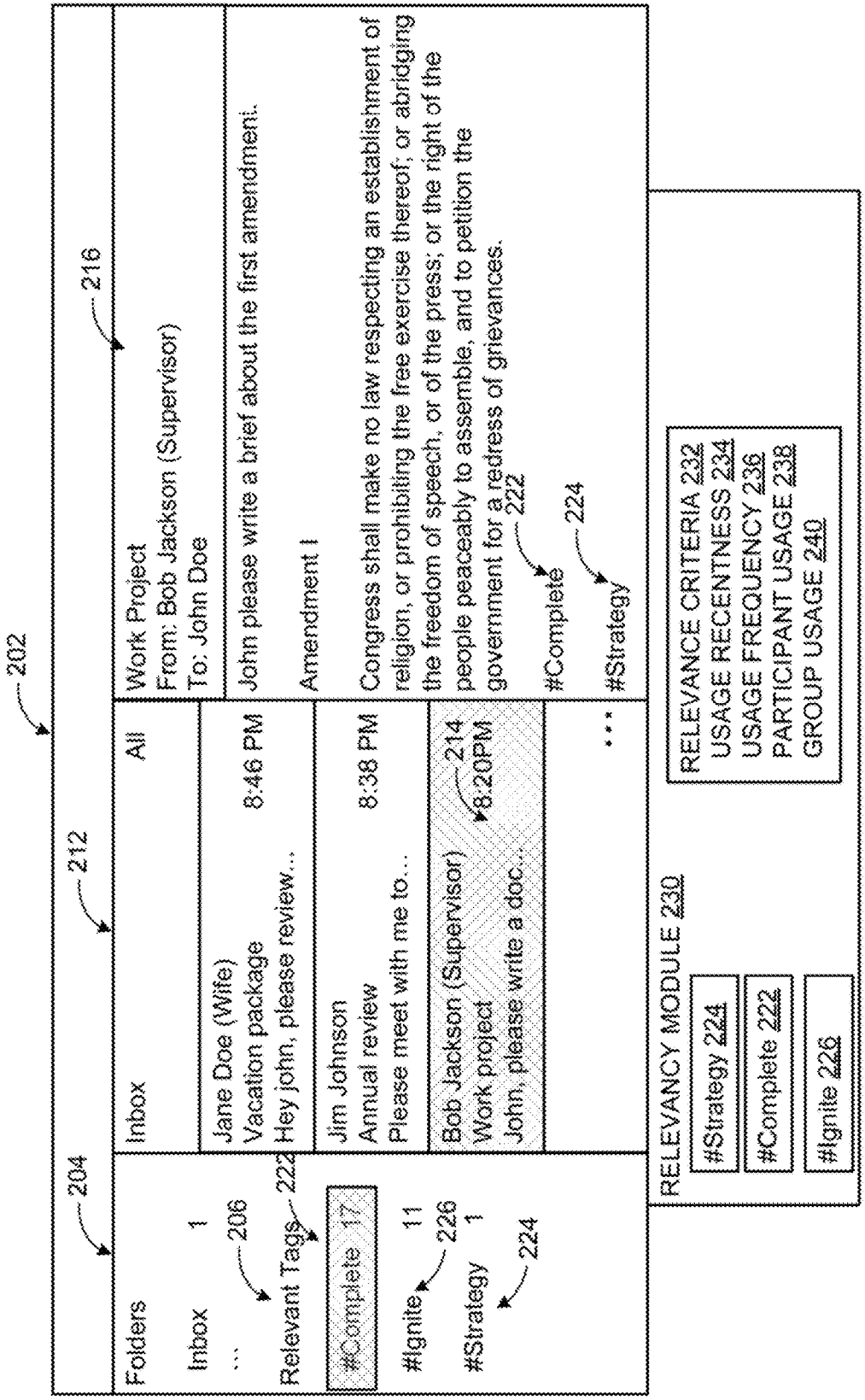
FIG. 2 is a display diagram illustrating an example of search and analysis operations to provide relevance based dynamic hashing navigation, according to embodiments.

FIG. 2 is a display diagram illustrating an example of search and analysis operations to provide relevance based dynamic hashtag navigation, according to embodiments.

In a diagram 200, a communication application 202 may provide user interface elements to present hashtags used to organize communications. An example of the communication application 202 may include an email processing application. An example of a communication my include an email. An example of a hashtag may include a label or a description used to categorize the communication 216.

A rendering module of the communication application 202 may display a navigation user interface 204 to provide navigation elements for interactions with communications and hashtags. The navigation user interface 204 may include a hashtag navigation section 206. The hashtag navigation section 206 may provide hashtags that are identified as relevant to a participant interacting with the communication application 202. The hashtag navigation section 206 may include hashtags (222, 224, and 226) with operations to display communication summaries. The communication summaries may refer to communications that are categorized with the hashtags (222, 224, and 226. The hashtags (222, 224, and 226) may be presented with a counter that reflects the number of the communications organized by the hashtags (222, 224, and 226).

The summaries user interface 212 may include summaries of the communications. A summary 214 of the communication 216 may include information such as a sender, a subject, a time received (and/or sent), and/or a summary of the content, among others. The rendering module of the communication application 202 may display the communication 216 in response to an action detected on the summary 214 (that is associated with the communication 216). The communication 216 may include information such as a subject, a sender, a participant (such as a receiver and/or an organizer), a time received (and/or sent), and/or a content 218 of the communication 216.

The hashtags (222, 224, and 226) may start with a hashtag character (such as a hash character, and/or a number sign, among others). The communications may be searched to identify the hashtags (222, 224, and 226). The hashtags (222, 224, and 226) may also be displayed in the navigation user interface 204 to allow for an interaction with communications associated with the hashtags (222, 224, and 226). For example, the rendering module of the communication application 202 may detect an action on the hashtag 222. In response, the hashtag 222 in the navigation user interface may be highlighted. Furthermore, communication summaries associated with the hashtag 222 may also be displayed on the summaries user interface 212. The communication 216 may further be presented in response to an action on the summary 214. The hashtags (222 and 224) used to categorize the communication 216 may be displayed within the communication 216.

In an example scenario, a relevancy module 230 of the communication application 202 may search communications to identify hashtags (222, 224, and 226) used to categorize the communications. A relevance score may be computed for each of the hashtags (222, 224, and 226). The relevancy module 230 may process the hashtags (222, 224, and 226) based on a relevance criteria 232. The relevance criteria may include a usage recentness 234, a usage frequency, a participant usage 238, and/or a group usage 240, among outer criteria.

The relevancy module may initiate a computation of the relevance score by processing the hashtags (222, 224, and 226) to identify the usage recentness associated with the hashtags (222, 224, and 226). The hashtags (222, 224, and 226) may be sorted within a range from a recent usage to a remote usage. For example, a recent usage may include a usage of the hashtag 222 on a time period that is deemed new. A remote usage may include a usage of the hashing 222 on a time period that is deemed distant.

Next, a numerical value may be assigned to the hashtags (222, 224, and 226). The recent usage may be assigned a high numerical value (such as 9 out of a range from 10 to 0). The remote usage may be assigned a low numerical value (such as 2 out of range from 10 to 0). The numerical value may be applied as a component of the relevance score to the hashtags (222, 224, and 226).

The numerical value based on the usage recentness may form a total value of the relevance score. Alternatively, other numerical values based on other criteria may also be used to form the relevance scores. For example, the relevance module 230 may process the hashtags (222, 224, and 226) to identify a usage frequency associated with the hashtags (222, 224, and 226). The hashtags (222, 224, and 226) may be sorted within a range from a frequent usage to a rare usage.

Similar to the usage recentness 234 based relevance criteria 232, a numerical value based on the usage frequency 236 may be assigned to the hashtags (222, 224, and 226). The frequent usage may be assigned a high numerical value (such as 10 out of a range of 10 to 0) and the rare usage may be assigned a low numerical value (such as 0 out of a range of 10 to 0). The numerical value may be applied as a component of the relevance score.

Alternatively, a participant associated with the communications ma be identified. The participant may be a controller if the communication application 202. Alternatively, the participant may be a sender or a receiver of the communications. The relevancy module may process the hashtags (222, 224, and 226) to detect a participant usage 238 by the participant. If the participant usage 238 is detected in a subset of the hashtags (222, 224, and 226), a numerical value (such as 1) may be assigned to the subset of the hashtags (222, 224, and 226). Next, the numerical value may be applied as a component of the relevance score for the hashtags (222, 224, and 226).

Furthermore, a group associated with the communications may be identified. The group may include a number of participants who have a relationship such as co-workers, and/or a team, among others. The hashtags (222, 224, and 226) may be processed to detect a group usage 240 by the group. Similar to participant usage scenario, a numerical value (such as 5) may be assigned to a subset of the hashtags (222, 224, and 226) associated with the group usage. The numerical value may be applied as a component of the relevance score for the hashtags (222, 224, and 226).

The numerical value assigned based on a group usage may be higher than the numerical value assigned based on the participant usage 238 in a scenario where the group usage is more detrimental to the relevance of the hashtags (222, 224, and 226). Alternatively, the numerical value assigned based on the participant usage 238 may be higher than the numerical value assigned based on the group usage 240 in a scenario where the participant usage 238 is more detrimental to the relevance of the hashtags (222, 224, and 226). The relevance criteria 232 and numerical values assigned to the relevance criteria 232 may be configurable based on input provided by a stakeholder or other interested parties associated with the relevance of the hashtags (222, 224, and 226).

Figure 3:
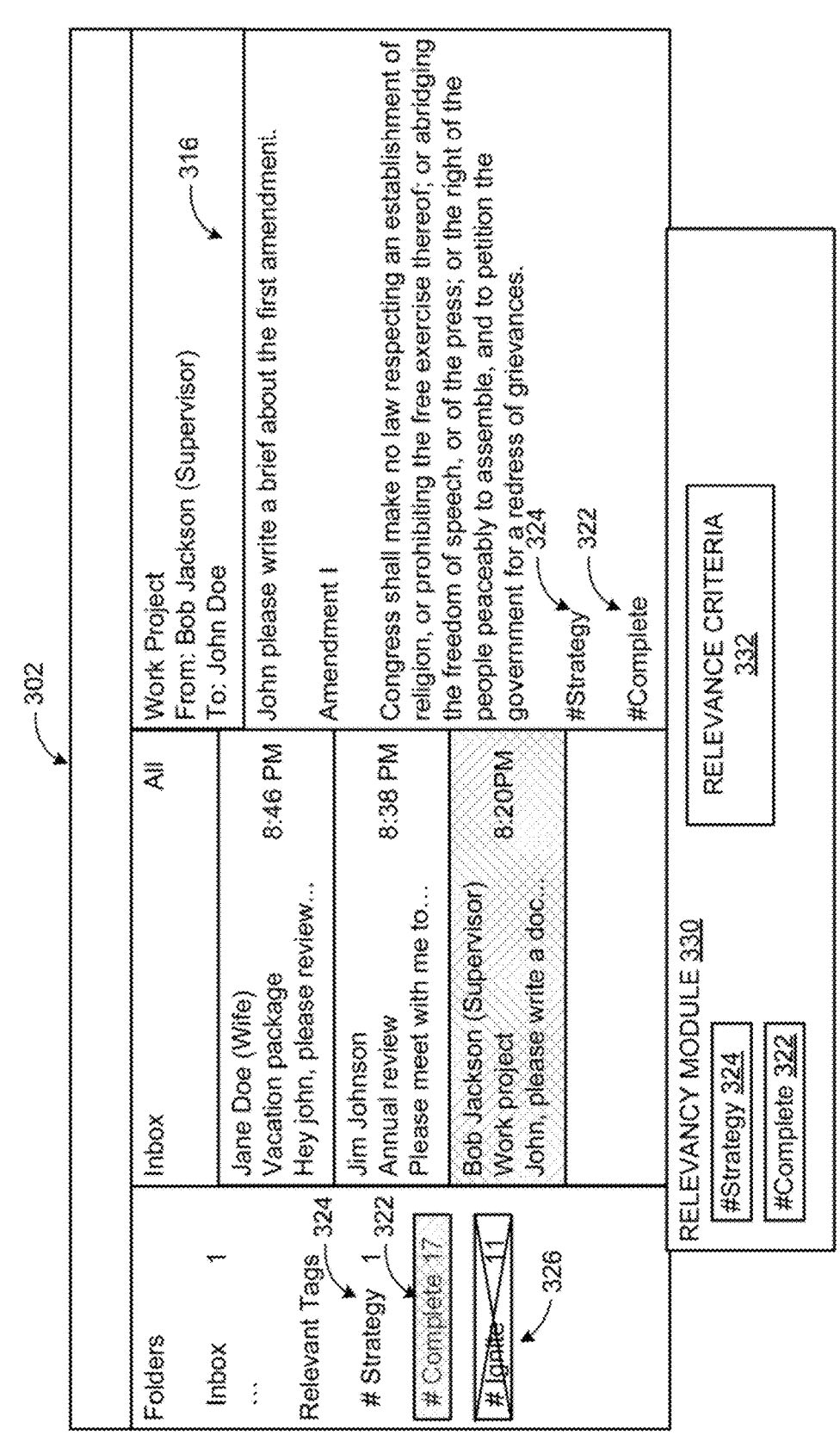
FIG. 3 is a display diagram illustrating an example of processing hashtags with a relevance criteria, according to embodiments.

FIG. 3 is a display diagram illustrating an example of processing hashtags with relevance criteria, according to embodiments.

In a diagram 300, a communication application 302 my present hashtags (322, 324, and 326) used to categorize communications in a navigation user interface. The hashtags 322, 324, and 326) may be ranked based on a relevance score. The relevance score is assigned to the hashtags (322, 324, and 326) based on the relevance criteria 332.

For example, the relevance score of the hashtag 324 may have increased because of a change in relevance criteria such as a participant. As a result of the change, the relevance score of the hashing 324 may be higher than a relevance score of the hashtag 322. The relevancy module 330 of the communication application 302 may reorder the hashtags (322, 324, and 326) by repositioning the hashtag 324 above the hashtag 322. To reflect the change, a rendering module of the communication application 302 may update the hashtags (322, 324, and 326) displayed in the navigation user interface by repositioning the hashtag 324 above the hashing 322.

The relevance score of the hashtags (322, 324, and 326) may also be compared against an interest threshold. The interest threshold may be a participant configurable value to reflect an interest value above which the participant may be interested in the hashtag. Alternatively, the interest threshold may be a dynamically adjusted value that is adjusted based, on changes to attributes associated with die participant. For example, an interaction number associated a hashtag over a time period may be normalized based on repeated measurements across multiple time periods. The normalized value may be used as an interest threshold.

The relevancy module 330 of the communication application may detect a subset of the hashtags (322, 324, and 326) as below the interest threshold. For example, the hashtag 326 may be detected as below the interest threshold. In response, the rendering module of the communication application 302 may remove the hashtag 326 from the navigation user interface to keep the number of hashtags displayed in the navigator user interface down to a relevant size.

FIG. 4 is a display diagram illustrating an example of presenting relevance based dynamic hashtag navigation, according to embodiments.

In a diagram 400, a relevancy module of a communication application 402 may process hashtags (422 and 424) to assign relevance scores to the hashtags (422 and 424). The hashtags (422 and 424) may be ordered based on the relevance scores and presented in a navigation user interface. The relevancy module may continually monitor the relevance criteria of the hashtags (422 and 424) to detect changes to the relevance criteria. If a change is detected, the hashtags (422 and 424) may be reprocessed to update the relevance scores and re-ordered. For example if the relevance score of the hashtag 424 changes to a higher value than the relevance score of the hashtag 422, a rendering module of the communication application 402 may reposition the hashtag 424 above the hashtag 422 in the navigation user interface.

A participant who interacts with the communication application 402 may be notified of the change to the relevance criteria of the hashtags (422 and 424) with a highlighting scheme to highlight the hashtag 424. Communication summaries of communications (categorized with the hashtag 424) may also be displayed in a summaries user interface to further notify the participant of the change associated with the hashtag 424.

As discussed above, the application may be employed to perform operations to provide relevance based dynamic hashtag navigation. An increased user efficiency with the communication application 102 may occur as a result of dynamically managing presentation and removal of hashtags in a navigation user interface. Additionally, continued removal of hashtags deemed not relevant from the navigation user interface may reduce processor load increase processing speed, conserve memory, and reduce network bandwidth usage.

Embodiments, as described herein, address a need that arises from a lack of efficiency between the participants interacting through the communication applications executed on various computing devices. The actions/operations described herein are not a mere use of a computer, but address results that are a direct consequence of software used as a service offered to large numbers of users and applications.

The example scenarios and schemes in FIG. 1 through 4 are shown with specific components, data types, and configurations. Embodiments are not limited to systems according to these example configurations. Relevance based dynamic hashtag navigation may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
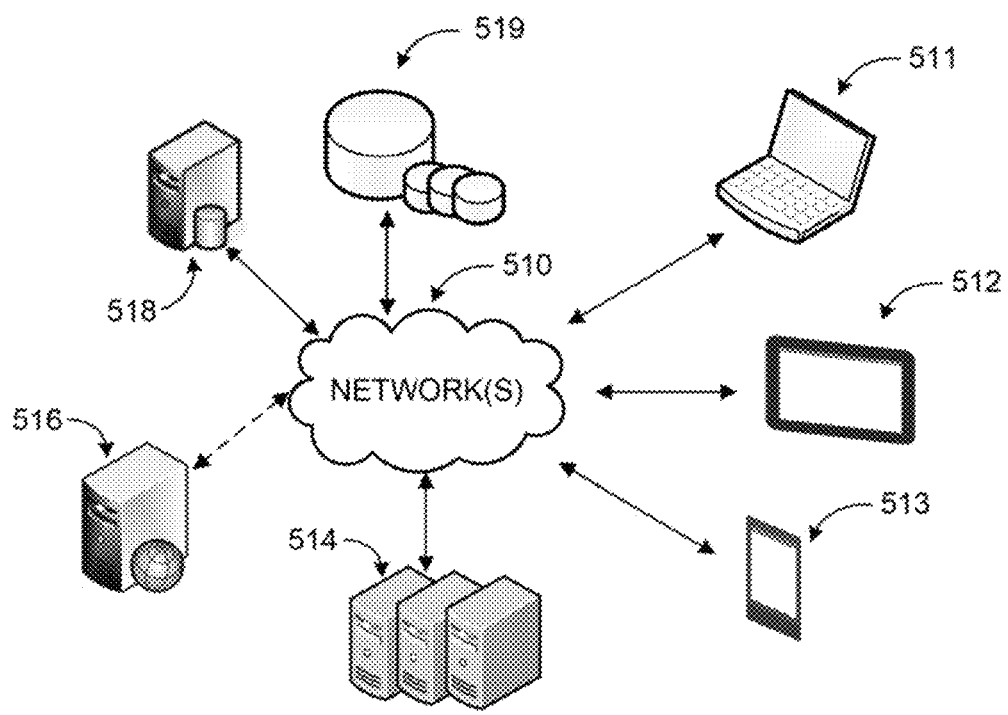
FIG. 5 is a simplified networked environment, where a system according to embodiments may be implemented.

FIG. 5 is an example networked environment, where embodiments may be implemented. A communication application configured to provide relevance based hashtag navigation may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may search communications to identify hashtags associated with the communications. A relevance score may be computed for each hashtag based on a relevance criteria associated with the hashtags. The hashtags may be ranked based on the relevance score. Next, the hashtags may be presented in a navigation user interface. The communication application may store data associated with the hashtag and the communication in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide relevance based dynamic hashtag navigation. Furthermore, the networked environments discussed in FIG. 5 are for illustration purposes only. Embodiments are not limited to the example applications, modules, or processes.

Figure 6:
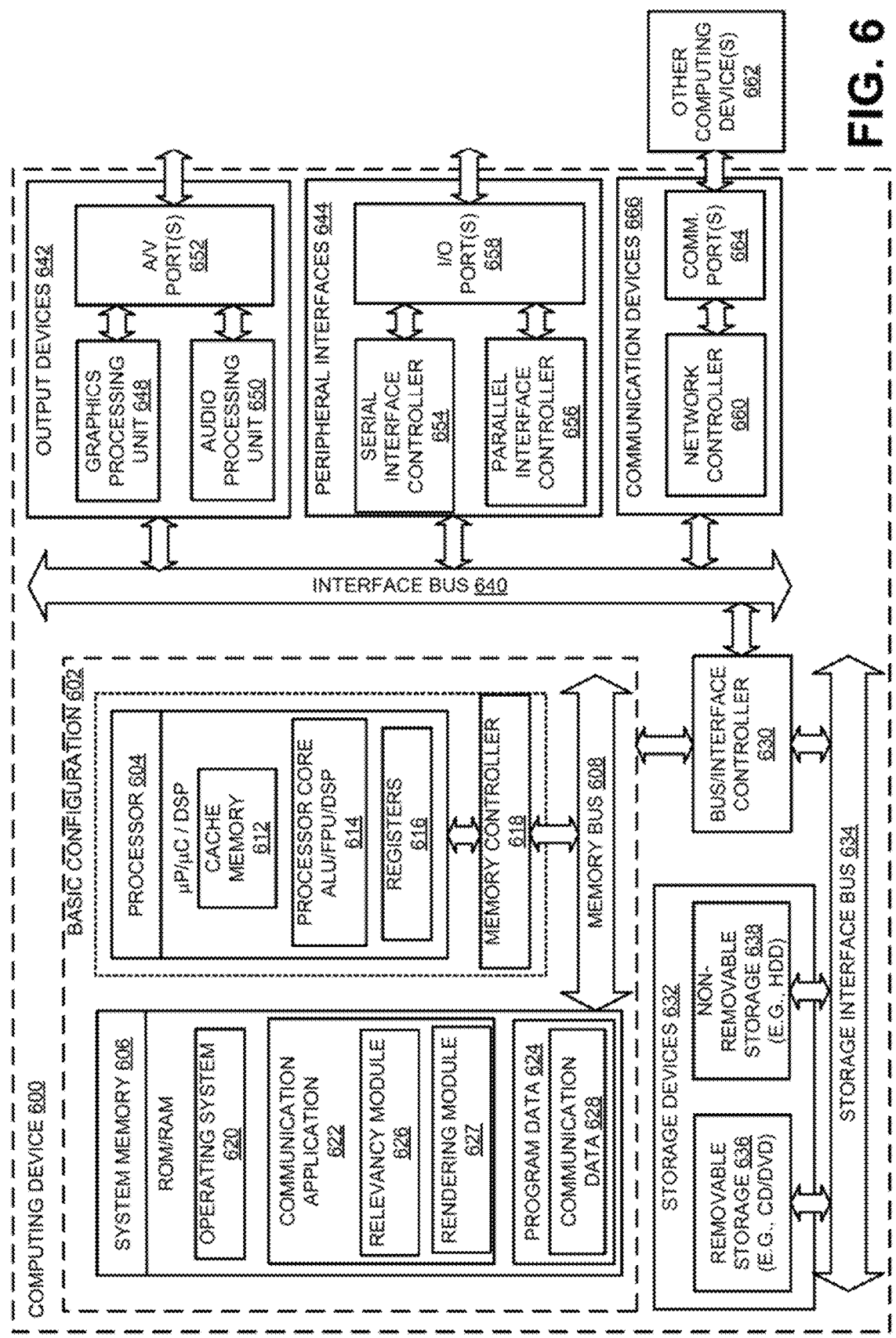
FIG. 6 is a block diagram of an example computing device, which may be used to provide relevance based dynamic hashtag navigation, according to embodiments.

FIG. 6 is a block diagram of an example computing device, which may be used to provide relevance based dynamic hashtag navigation, according to embodiments.

For example, computing device 600 may be used as a server desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication application 622, and a program data 624. The communication application 622 nay include components such as a relevancy module 626 and a rendering module 627. The relevancy module 626 and the rendering module 627 may execute the processes associated with the communication application 622. The relevancy module may search communications to identify hashtags associated with the communications. A relevance score may be computed for each hashtag based on a relevance criteria associated with the hashtags. The hashtags may be ranked based on the relevance score. Next, the rendering module 627 may present the hashtags in a navigation user interface.

Components of the communication application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the communication application 622, displayed by the touch based device. The program data 624 may also include, among other data, communication data 628, or the like, as described herein. The communication data 628 may include a hashtag, and/or a communication, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.)) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication Media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide relevance based dynamic hashtag navigation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs portion of the program. In other embodiments, the human interaction can be automated such as by pre-selected criteria that may be machine automated.

Figure 7:
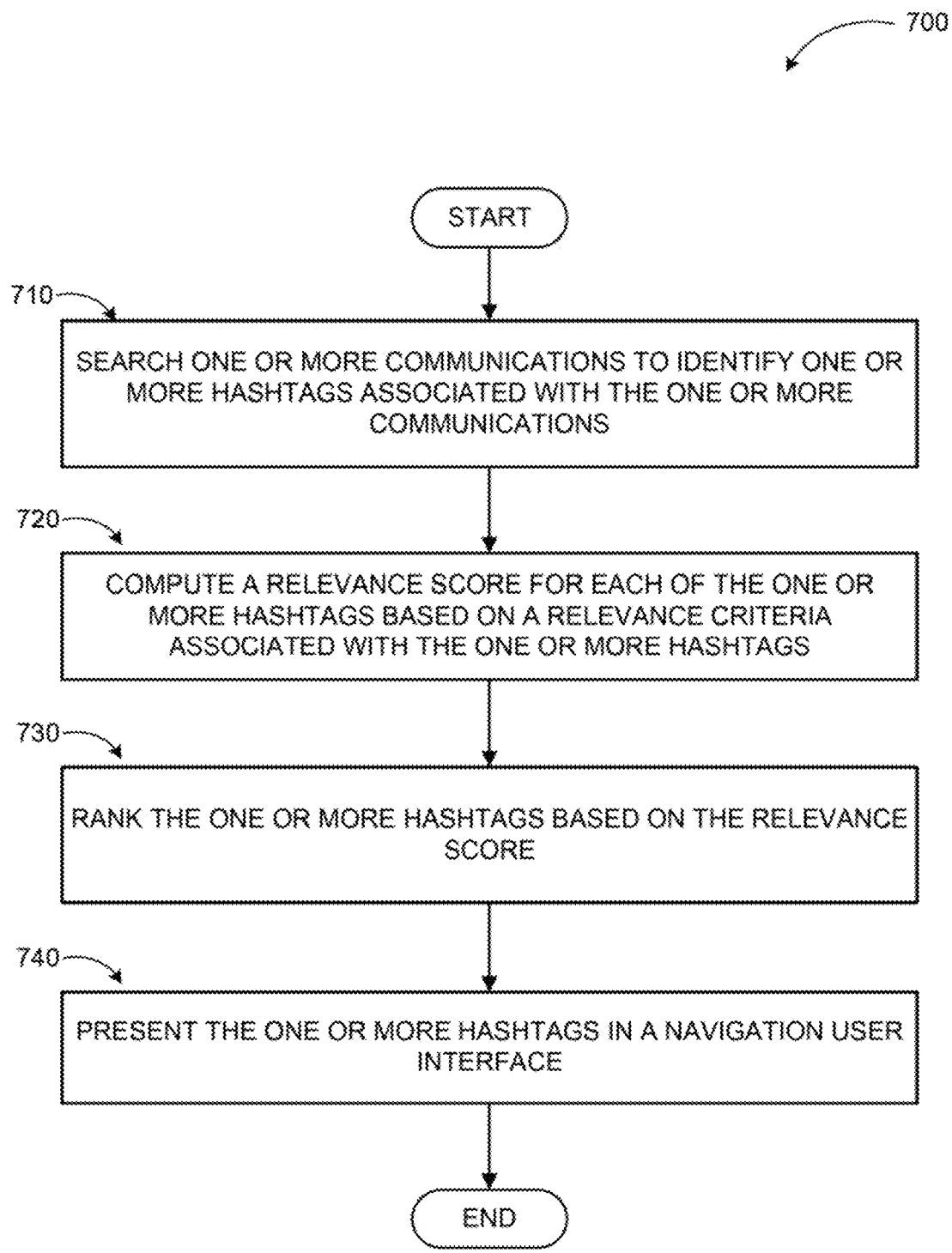
FIG. 7 is a logic flow diagram illustrating a process for providing relevance based dynamic bashing navigation, according to embodiments.

FIG. 7 is a logic flow diagram illustrating a process for providing relevance based dynamic hashtag navigation, according to embodiments. Process 700 may be implemented on a computing device, such as the computing device 600 or another system.

Process 700 begins with operation 710, where a communication application may search communications to identify hashtags associated with the communications. At operation 720, it relevance score may be computed for each hashing based on a relevance criteria associated with the hashtags. The relevance criteria may include a usage recentness, a usage frequency, a participant usage, and/or a group usage, among criteria associated with hashtags.

The hashtags may be ranked based on the relevance score at operation 730. At operation 740, the hashtags may be presented in a navigation user interface. A relevance score of the hashtags may be continually monitored and updated based on changes to the relevance criteria. A position of a hashtag may be moved up and down in the navigation user interface based on an increase or decrease of the relevance score.

The operations included in process 700 are for illustration purposes. Providing relevance based dynamic hashtag navigation may be implemented by similar processes with fewer or additional steps, as well as in different order of operations using the principles described herein. The operations described herein may be executed by one or more processors operated on one or more computing devices, one or more processor cores, specialized processing, devices, and/or general purpose processors, among other examples.

In some examples, a computing device for providing relevance based dynamic hashtag navigation is described. The computing device includes a display device, a memory configured to store instructions associated with a communication application, one or more processors coupled to the memory and the display device. The one or more processors execute the communication application in conjunction with the instructions stored in the memory. The communication application includes a relevancy module and a rendering module. The relevancy module is configured to search one or more communications to identify one or more hashtags associated with the one or more communications, compute a relevance score for each of the one or more hashtags based on a relevance criteria associated with the one or more hashtags, and rank the one or more hashtags based on the relevance score. The rendering module is configured to present, on the display device, the one or more hashtags in a navigation user interface.

In other examples, the criteria includes one or more of a usage recentness, a usage frequency, a participant usage, and a group usage associated with each of the one more hashtags. The relevancy module is further configured to process the one or more hashtags to identify a usage recentness associated with each of the one or hashtags, sort the one or more hashtags within a range from a recent usage to a remote usage, and assign a numerical value to each of the one or more hashtags, where the recent usage receives a high numerical value and the remote usage receives a low numerical value, and apply the numerical value as a component of the relevance score for each of the one or more hashtags. The relevancy module is further configured to process the one or more hashtags to identify a usage frequency associated with each of the one or more hashtags, sort the one or more hashtags within a range from a frequent usage to a rare usage, assign a numerical value to each of the one or more hashtags, where the frequent usage receives a high numerical value and the rare usage receives a low numerical value, and apply the numerical value as a component of the relevance score for each of the one or more hashtags.

In further examples, the relevancy module is further configured to identify a participant associated with the one or more communications, process each of the one or more hashtags to detect a participant usage by the participant, assign a numerical value to a subset of the one or more hashtags associated with the participant usage, and apply the numerical value as a component of the relevance score for each of the subset of the one or more hashtags. The relevancy module is further configured to identify a group that participates in the one or more communications, process each of the one or more hashtags to detect a group usage by the group, assign a numerical value to a subset of the one or more hashtags associated with the group usage, and apply the numerical value as a component of the relevance score for each of the subset of the one or more hashtags.

In other examples, the relevancy module is further configured to detect a change in the relevance score of a subset of the one or more hashtags, reorder the one of more hashtags based on the relevance score, and provide, to the rendering module, a reordering the one or more hashtags to update a presentation of the one or more hashtags. The rendering module is further configured to update the one or more hashtags with the reordering of the one or more hashtags.

In some examples, a method executed on a computing device for providing relevance based dynamic hashtag navigation is described. The method includes searching one or more communications to identify one or more hashtags associated with the one or more communications, computing a relevance score for each of the one or more hashtags based on a relevance criteria associated with the one or more hashtags, where the relevance criteria includes usage metrics associated with the one or more hashtags and the one or more communications, ranking, the one or more hashtags based on the relevance score, and presenting the one or more ranked hashtags in a navigation user interface.

In other examples, the method further includes comparing the relevance score for each of the one or more hashtags to an interest threshold, detecting a subset of the one or more hashtags as below the interest threshold, and removing the subset of the one or more hashtags from the navigation user interface. The method further includes detecting a new hashtag assigned to a subset of the one or more communications, computing the relevance score for the new hashtag based on the relevance criteria associated with the new hashtag, inserting the new hashtag to the one or more hashtags based on the relevance score of the new hashtag, and presenting the new hashtag within the one or more hashtags.

In some examples, a computer-readable memory device with instructions stored thereon for providing relevance based dynamic hashtag navigation. The instructions include actions that are similar to the actions of the method.

In some examples, a means for providing relevance based dynamic hashtag navigation is described. The means for providing relevance based dynamic hashtag navigation includes a means for searching one or more communications to identify one or more hashtags associated with the one or more communications, a means for computing a relevance score for each of the one or more hashtags based on a relevance criteria associated with the one or more hashtags, a means for ranking the one or more hashtags based on the relevance score, a means for presenting the one or more hashtags in a navigation user interface.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing relevance based dynamic hashtag navigation, the computing device comprising:
    a memory configured to store instructions associated with a communication application; one or more processors coupled to the memory and the display device, the one or more
processors executing the communication application in conjunction with the instructions stored in the memory, wherein the one or more processors are configured to:
    search one or more communication messages associated with the communication application to identify one or more hashtags associated with the one or more communication messages;
    identify a participant associated with the one or more communication messages; process each of the one or more hashtags to detect a participant usage by the participant, wherein a numerical value is assigned to the one or more hashtags with a detected participant usage;
    compute a relevance score for each of the one or more hashtags based on a relevance criteria based on the assigned numerical value associated with the one or more hashtags;
    rank the one or more hashtags based on the relevance score;
    compare the relevance score for each of the one or more hashtags to an interest threshold, wherein the interest threshold is a normalized value of interactions with each of the one or more hashtags over a time period;
    detect a subset of the one or more hashtags as below the interest threshold;
    enable, on a display device, displaying the one or more hashtags in a navigation user interface; and
    remove the subset of the one or more hashtags from the navigation user interface.

2. The computing device of claim 1, wherein the relevance criteria includes one or more of: a usage recentness, a usage frequency, a participant usage, and a group usage associated with each of the one or more hashtags, wherein the usage recentness is a measure of a time period in which the hashtag has been used.

3. The computing device of claim 1, wherein the one or more processors are further configured to:
    process the one or more hashtags to identify a usage recentness associated with each of the one or more hashtags; and
    sort the one or more hashtags within a range from a recent usage to a remote usage.

4. The computing device of claim 3, wherein the one or more processors are further configured to:
    assign a numerical value to each of the one or more hashtags, wherein the recent usage receives a high numerical value and the remote usage receives a low numerical value; and
    apply the numerical value as a component of the relevance score for each of the one or more hashtags.

5. The computing device of claim 1, wherein the one or more processors are further configured to:
    process the one or more hashtags to identify a usage frequency associated with each of the one or more hashtags; and
    sort the one or more hashtags within a range from a frequent usage to a rare usage.

6. The computing device of claim 5, wherein the one or more processors are further configured to:
    assign a numerical value to each of the one or more hashtags, wherein the frequent usage receives a high numerical value and the rare usage receives a low numerical value; and
    apply the numerical value as a component of the relevance score for each of the one or more hashtags.

7. The computing device of claim 1, wherein the one or more processors are further configured to:
    assign a numerical value to a subset of the one or more hashtags associated with the participant usage; and
    apply the numerical value as a component of the relevance score for each of the subset of the one or more hashtags.

8. The computing device of claim 1, wherein the one or more processors are further configured to:
    identify a group that participates in the one or more communication messages;
    and process each of the one or more hashtags to detect a group usage by the group.

9. The computing device of claim 8, wherein the one or more processors are further configured to:
    assign a numerical value to a subset of the one or more hashtags associated with the group usage; and
    apply the numerical value as a component of the relevance score for each of the subset of the one or more hashtags.

10. The computing device of claim 1, wherein the one or more processors are further configured to:
    detect a change in the relevance score of a subset of the one or more hashtags; reorder the one of more hashtags based on the relevance score; and
    provide, to the rendering module, a reordering the one or more hashtags to update a presentation of the one or more hashtags.

11. The computing device of claim 10, wherein the one or more processors are further configured to:
update the one or more hashtags with the reordering of the one or more hashtags.

12. A method executed on a computing device for providing relevance based dynamic hashtag navigation, the method comprising:
searching one or more communication messages to identify one or more hashtags associated with the one or more communication messages;
identifying a participant associated with the one or more communication messages; processing each of the one or more hashtags to detect a participant usage by the participant, wherein a numerical value is assigned to the one or more hashtags with a detected participant usage;
computing a relevance score for each of the one or more hashtags based on a relevance criteria associated with the one or more hashtags based in part on the assigned numerical value, wherein the relevance criteria includes usage metrics associated with the one or more hashtags and the one or more communication messages;
ranking the one or more hashtags based on the relevance score;
comparing the relevance score for each of the one or more hashtags to an interest threshold;
detecting a subset of the one or more hashtags as below the interest threshold;
enabling the presentation of the one or more ranked hashtags in a navigation user interface; and
removing the subset of the one or more hashtags from the navigation user interface.

13. The method of claim 12, further comprising:
detecting a new hashtag assigned to a subset of the one or more communication messages; and
computing the relevance score for the new hashtag based on the relevance criteria associated with the new hashtag.

14. The method of claim 13, further comprising:
inserting the new hashtag to the one or more hashtags based on the relevance score of the new hashtag; and
presenting the new hashtag within the one or more hashtags.

15. A computer-readable memory device with instructions stored thereon for providing relevance based dynamic hashtag navigation, the instructions comprising: searching one or more communication messages to identify one or more hashtags associated with the one or more communication messages;
identifying a participant associated with the one or more communication messages; processing each of the one or more hashtags to detect a participant usage by the participant, wherein a numerical value is assigned to the one or more hashtags with a detected participant usage;
computing a relevance score for each of the one or more hashtags based on a relevance criteria associated with the one or more hashtags based in part on the assigned numerical value, wherein the relevance criteria includes usage metrics associated with the one or more hashtags and the one or more communications;
ranking the one or more hashtags based on the relevance score; and
comparing the relevance score for each of the one or more hashtags to an interest threshold;
detecting a subset of the one or more hashtags as below the interest threshold;
enabling the presentation of the one or more ranked hashtags in a navigation user interface; and
removing the subset of the one or more hashtags from the navigation user interface.

16. The computer-readable memory device of claim 15, wherein the instructions further comprise:
assigning a numerical value to a subset of the one or more hashtags associated with a group usage; and
applying the numerical value as a component of the relevance score for each of the subset of the one or more hashtags.

* * * * *